(12) United States Patent
Rappl et al.

(10) Patent No.: US 8,890,029 B2
(45) Date of Patent: Nov. 18, 2014

(54) WELDING CONSUMABLES AND CONSUMABLE HOLDERS

(75) Inventors: James Francis Rappl, Neenah, WI (US); Thomas Don Lahti, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 707 days.

(21) Appl. No.: 13/090,965

(22) Filed: Apr. 20, 2011

(65) Prior Publication Data

US 2011/0284513 A1  Nov. 24, 2011

Related U.S. Application Data (60) Provisional application No. 61/346,970, filed on May 21, 2010.

(51) Int. Cl.
  *B23K 9/10* (2006.01)
  *B23K 9/28* (2006.01)
  *B23K 35/02* (2006.01)
  *B23K 9/00* (2006.01)
  *B23K 35/40* (2006.01)

(52) U.S. Cl.
  CPC .......... *B23K 9/0008* (2013.01); *B23K 35/0261* (2013.01); *B23K 35/404* (2013.01); *B23K 9/282* (2013.01)
  USPC ...................................... 219/130.1; 219/138

(58) Field of Classification Search
  USPC .................. 219/130.1–137.31, 138
  See application file for complete search history.

(56) References Cited

U.S. PATENT DOCUMENTS

| 2,236,372 | A | * | 3/1941 | Kotchi et al. ............... 219/138 |
| 2,394,204 | A | * | 2/1946 | Randall ........................ 219/144 |
| 2,433,355 | A |   | 12/1947 | French, Sr. |
| 2,522,810 | A | * | 9/1950 | Bailey .......................... 439/729 |
| 2,722,588 | A | * | 11/1955 | Wagner ....................... 219/138 |
| 3,102,827 | A |   | 9/1963 | Kriewall et al. |
| 2,360,016 | A |   | 10/1994 | Roland |

FOREIGN PATENT DOCUMENTS

GB 603064 6/1948
JP 53119424 A 10/1978

OTHER PUBLICATIONS

Apitco Limited Engineering Growth; "Project Profile Welding Electrodes"; www.apitco.org; pp. 1-5.
International Search Report for application No. PCT/US2011/037466 mailed Sep. 19, 2011.

* cited by examiner

*Primary Examiner* — Sang Y Paik
(74) *Attorney, Agent, or Firm* — Fletcher Yoder P.C.

(57) ABSTRACT

A welding torch with a welding electrode and a welding electrode holder is provided. One welding torch includes a securing mechanism and an insulated grip. The securing mechanism is configured to secure an exposed central portion of a welding rod bounded by flux covered first and second sides. The securing mechanism is also configured to make electrical contact with the central portion of the rod for arc welding with the first side. The insulated grip is configured to cover the second side of the welding rod.

6 Claims, 5 Drawing Sheets

WELDING CONSUMABLES AND CONSUMABLE HOLDERS

CROSS-REFERENCE TO RELATED APPLICATIONS

This application is a Non-Provisional Patent Application of U.S. Provisional Patent Application No. 61/346,970 entitled "Welding Electrode Holder with Specialized Electrode", filed May 21, 2010, which is herein incorporated by reference.

BACKGROUND

The invention relates generally to a welding torch and, more particularly, to a welding electrode and a welding electrode holder.

Welding is a process that has become increasingly ubiquitous in various industries and applications. While such processes may be automated in certain contexts, a large number of applications continue to exist for manual welding operations. Such welding operations rely on a variety of types of equipment to ensure the supply of welding consumables (e.g., electrodes, etc.) is provided to the weld in an appropriate amount at the desired time. For example, shielded metal arc welding (SMAW) typically relies on a welding electrode to provide filler material for a weld.

Power is typically provided to the welding electrode via a welding torch coupled to a welding power source. That is, an electric current from the welding power source is typically used to strike an arc between a workpiece and the welding electrode. To that end, welding electrodes are often secured by the welding torch on one end, while the arc is formed utilizing the opposite end. In some circumstances, a welding operator may find it advantageous to alter the shape of the welding electrode prior to initiating the arc to obtain better control over the welding process. For example, some welding operators may bend the welding electrode for improved control of stick welding processes. Unfortunately, these practices are often associated with a variety of drawbacks since only a portion of the length of the welding electrode is utilized for the weld, while the remaining portion is discarded. Accordingly, there exists a need for improved welding systems that overcome these drawbacks.

BRIEF DESCRIPTION

In an exemplary embodiment, a welding torch includes a securing mechanism and an insulated grip. The securing mechanism is configured to secure an exposed central portion of a welding rod bounded by flux covered first and second sides. The securing mechanism is also configured to make electrical contact with the central portion of the rod for arc welding with the first side. The insulated grip is configured to cover the second side of the welding rod.

In another embodiment, a welding system includes a welding power supply having power conversion circuitry configured to receive primary power and to convert the primary power to a weld power output suitable for use in a welding operation. The welding system also includes an electrode holder having a first assembly configured to electrically insulate a first end of a welding electrode and a securing assembly configured to secure a portion of the welding electrode to expose a second end of the welding electrode. The welding system includes a welding cable configured to electrically couple the welding power supply to the electrode holder to apply the weld power output to the second end of the welding electrode.

In another embodiment, a welding rod includes a central portion having an electrode core material. The welding rod also includes a first side portion extending from a first side of the central portion and having the electrode core material coated in flux. The welding rod includes a second side portion extending from a second side of the central portion and having the electrode core material coated in flux. The first side portion and the second side portion are each configured to be utilized as a welding electrode in a welding operation, one at a time.

In another embodiment, a method of manufacturing a welding rod includes providing a rod of electrode core material, clamping a central portion of the rod of electrode core material, coating the clamped rod with flux, and drying the flux coated rod.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described below, provided herein are welding systems including one or more features that may improve the efficiency of a shielded metal arc welding (SMAW) process (i.e., stick welding). For example, embodiments of presently disclosed welding torch assemblies and welding rods may enable a welding operator to more fully utilize the length of a welding electrode in a stick welding process. For example, in one embodiment, a welding electrode is made of an electrode core material having a first flux section and a second flux section that flank an exposed central section. The foregoing embodiment of the welding electrode may be compatible with embodiments of welding electrode holders disclosed herein to provide for arc ignition and welding with both the first flux section and the second flux section, one at a time. To that end, welding electrode holders disclosed herein may include securing assemblies and insulating assemblies capable of securing the central section of the welding electrode such that one of the flux sections may be utilized for welding while the other flux section remains electrically insulated within the electrode holder.

Figure 1:
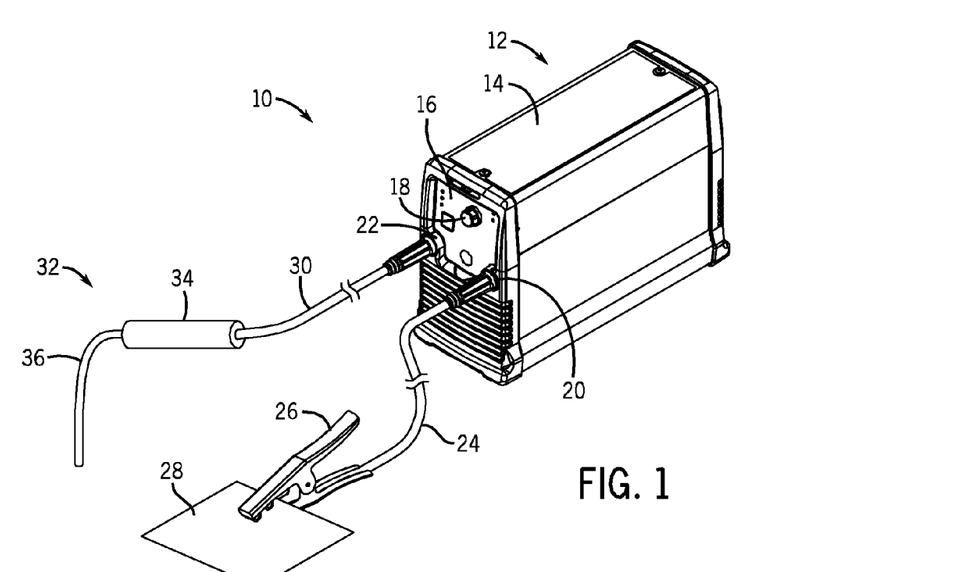
FIG. 1 is a perspective view of a welding system illustrating an embodiment of an electrode and an electrode holder in accordance with aspects of the present invention.

Turning now to the figures, FIG. 1 is a perspective view of an exemplary welding system 10 in accordance with an embodiment of the present invention. As appreciated, the welding system 10 may be utilized in a SMAW process (i.e., stick welding). The welding system 10 includes a welding power supply 12 having power conversion circuitry adapted to receive primary power and to convert the primary power to a weld power output suitable for use in a welding operation. For example, the primary power may be received from any primary source, such as a power grid, a generator, a wall outlet, and so forth. In some embodiments, the power conversion circuitry may be configured to output weld power at a substantially constant current consistent with conventional SMAW processes.

In the illustrated embodiment, the welding power supply 12 includes a housing 14 having a top panel, side panels, a front panel, and a rear panel. In some embodiments, the top panel may include a handle that facilitates transport of the welding power supply 12 by an operator. Furthermore, the welding power supply 12 may include a controller configured to control operation of the welding power supply 12. The front panel of the welding power supply 12 includes a control panel 16 through which an operator may set one or more parameters of the welding process, for example, via knob 18 (or multiple knobs, buttons, touchscreens, etc.).

The front of the welding power supply 12 also includes welding terminals 20 and 22. A cable 24 terminating in a ground clamp 26 is attached to terminal 20 of the welding power supply 12. The clamp 26 is adapted to clamp to a workpiece 28 during a welding operation. A second cable 30 extends from terminal 22 to couple a welding torch assembly 32 to the welding power supply 12. When the welding torch assembly 32 is utilized in a welding operation to establish a welding arc, the ground clamp 26 clamps to the workpiece 28 to close the circuit between the welding power source 12, the workpiece, 28, and the welding torch 32.

The illustrated welding torch assembly 32 includes an electrode holder 34, which holds a welding electrode 36. As described in more detail below, the welding torch assembly 32 includes a securing mechanism that secures the welding electrode 36 within the assembly and enables a welding current to flow from the welding power supply 12 through the exposed portion of the welding electrode 36 shown in FIG. 1. Furthermore, the electrode holder 34 may include an insulated grip that covers a contained portion (not shown in FIG. 1) of the electrode 36 to electrically isolate the contained portion and a welding operator from the electrically conductive illustrated portion of the welding electrode 36 when a welding arc is established between the electrode 36 and the workpiece 28.

Figures 2, 3:
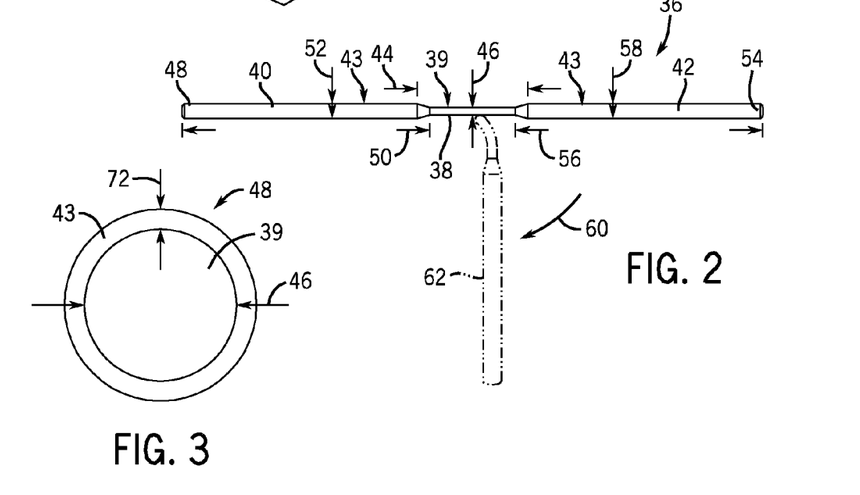
FIG. 2 illustrates an embodiment of the welding electrode of FIG. 1.
FIG. 3 is a side view of the exemplary welding electrode of FIG. 2 in accordance with an embodiment of the present invention.

FIG. 2 illustrates an embodiment of the welding electrode 36 of FIG. 1 adapted for use with the exemplary welding electrode holders disclosed herein. The welding electrode 36 includes a central portion 38, a first side portion 40, and a second side portion 42. The illustrated central portion 38 is an exposed portion of a rod made of an electrode core material 39 that extends through the welding electrode 36. The welding rod may be made from a variety of suitable materials, such as metals including but not limited to steel, stainless steel, nickel, copper-nickel, and iron-nickel. The first side portion 40 and the second side portion 42 of the welding electrode 36 are coated with flux 43 that surrounds the electrode core material 39. During a welding operation, the flux 43 is adapted to disintegrate to produce a shielding gas (e.g., $CO_2$) and/or slag, which may protect the weld from oxidation and contamination. In some embodiments, the flux 43 may be made from rutile, potassium silicate, sodium silicate, quartz, calcite, mica, iron alloys, or any other suitable material.

The central portion 38 of the welding electrode 36 is exposed (i.e., is not covered in flux) because the central portion 38 is not configured to be consumed during the welding process. Instead, the central portion 38 is provided to facilitate securing the welding electrode 36 within a welding torch assembly. To that end, the exposed central portion 38 extends for a distance 44 between the flux covered sides 40 and 42 to provide an area that may be retained, for example, in a clamp, for securing the electrode 36 within a welding torch. It should be noted that the distance 44 may be subject to considerable variations between embodiments of the welding electrode 36 depending on factors associated with the given welding application. For example, the distance 44 of the exposed central portion 38 may be approximately 1 to 6 cm, 3 to 8 cm, 5 to 10 cm, or any other suitable value. The exposed central portion 38 also has a diameter 46, which is the diameter of the rod of electrode core material. Here again, the diameter 46 may be subject to variations between embodiments and may be approximately 1 to 5 mm, 4 to 9 mm, 7 to 14 mm, or any other value. For further example, in some embodiments, the diameter 46 may be between approximately 3/32" and approximately 1/8".

The first side portion 40 is covered with flux 43 extending from the central portion 38 to a first end 48. That is, the first side portion 40 extends for a distance 50 between the central portion 38 and the first end 48. The distance 50 may vary between embodiments of the welding electrode 36. For example, the distance 50 of the first side 40 may be approximately 10 to 18 cm, 15 to 25 cm, 21 to 30 cm, or any other suitable value. Further, the first side 40 is defined by a diameter 52 that is approximately equal to the diameter 46 of the electrode core material combined with the distance the flux 43 extends outward from the electrode core material. The diameter 52 may vary from one embodiment of the welding electrode 36 to another. For example, the diameter 52 of the first side 40 may be approximately 2 to 10 mm, 8 to 18 mm, 14 to 28 mm, or any other suitable value.

Similarly, the second side portion 42 is covered with flux 43 extending from the central portion 38 to a second end 54. That is, the second side portion 42 extends for a distance 56 between the central portion 38 and the second end 54. The distance 56 may vary between embodiments of the welding electrode 36. For example, the distance 56 of the second side 42 may be approximately 10 to 18 cm, 15 to 25 cm, 21 to 30 cm, or any other value. The second side 42 also has a diameter 58 that is defined by the diameter 46 of the electrode core material as well as the flux surrounding the electrode core material. Again, the diameter 58 may vary from one embodiment of the welding electrode 36 to another. For example, the diameter 58 of the second side 42 may be approximately 2 to 10 mm, 8 to 18 mm, 14 to 28 mm, or any other suitable value.

In certain embodiments, one or both of the side portions 40 and 42 may be bent by a welding operator to improve control over a welding process. For example, as illustrated in FIG. 2, the second side 42 may be bent as shown by arrow 60 so that bent side 62 is rotated approximately 90 degrees from its unbent position. Such a bent position may be one of many bends that may be made to the welding electrode 36 prior to performing a welding operation. For example, the electrode 36 may be bent in an "L" manner as shown, an "S" manner, or any other desired manner. In such embodiments, a single side portion may be configured for use in the current welding operation, while the remaining side portion is configured to be electrically isolated from the weld operation. After one side portion is consumed during welding, the electrode 36 may be repositioned within an electrode holder to utilize the remaining side portion for additional welding. In such a way, presently disclosed embodiments may provide for welding with both the first side portion 40 and the second side portion 42, one at a time.

FIG. 3 is a side view of the welding electrode 36 of FIG. 2 illustrating features of the end 48 in more detail. As shown, the first end 48 of the electrode 36 includes the electrode core material 39 having diameter 46 and being surrounded by flux 43 having diameter 72. Accordingly, the diameter 52 of the first end 48 of the welding electrode 36 is defined by the diameter 46 and the diameter 72. As noted above, this diameter 52 of the welding electrode 36 may be between approximately 3/32" and approximately 1/8". As such, the flux 43 provided on the first end 48 increases the diameter of the first end portion 40 of the welding electrode 36 as compared to the central portion 38. In some embodiments, the flux 43 may increase the diameter 46 by approximately 0.5 to 2.5 mm, 2.0 to 4.5 mm, 3.5 to 7.0 mm, or any other suitable amount.

Figure 4:
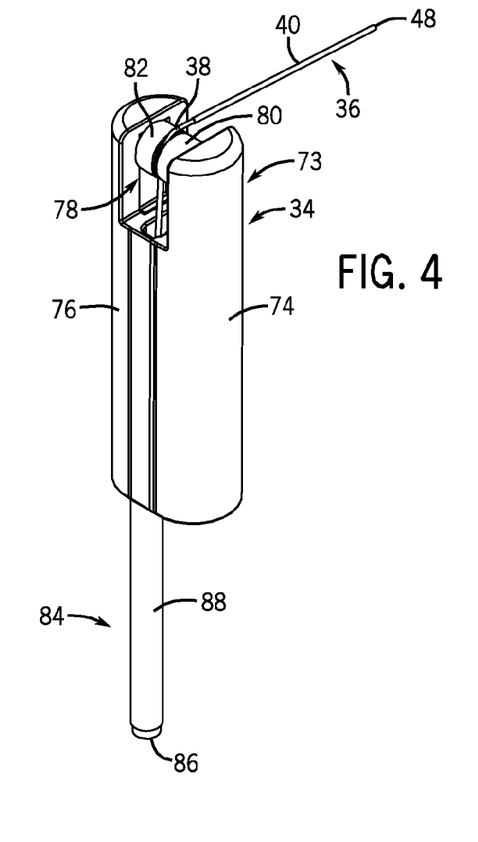
FIG. 4 is a perspective view of a welding torch assembly having a securing mechanism and an insulated grip in accordance with an embodiment of the present invention.

FIG. 4 is a perspective view of an embodiment of the electrode holder 34 of FIG. 1. As shown, the electrode holder 34 includes an insulated grip 73 that is depicted with the welding electrode 36 extending therefrom. The insulated grip 73 includes a first side assembly 74 and a second side assembly 76. The side assemblies 74 and 76 are made of an insulating material to enable a welding operator to hold the insulated grip 73. Further, as discussed in more detail below, the side assemblies 74 and 76 receive and cover the second side of the electrode 36.

The electrode holder 34 also includes a securing mechanism 78 having jaws 80 and 82 that are shown clamping the electrode 36. That is, the jaws 80 and 82 press against or clamp the central portion 38 of the electrode 36 to secure the electrode 36 in the electrode holder 34 such that the portion 48 is exposed for use in a welding operation, and the second portion of the welding electrode 36 is electrically insulated within the insulating grip 73. During operation, a cable 84 enables the welding current to flow through the first side portion 40 of the welding electrode 36. In the illustrated embodiment, the cable 84 includes a conductor 86 surrounded by an insulator 88. During welding, current is transferred to the first side portion 40 of the welding electrode 36 via the conductor 86 and the securing mechanism 78. Again, while the first side portion 40 of the welding electrode 36 is used to establish a welding arc, the second side portion of the welding electrode 36 is retained within the insulated grip 73 and is electrically isolated from the welding current path. It should be noted that in other embodiments, the second side portion of the welding electrode 36 may be used to establish a welding arc, while the first side portion 40 of the welding electrode 36 is retained within the insulated grip 73.

Although the insulated grip 73 is depicted having multiple side assemblies 74 and 76, certain embodiments of the insulated grip 73 may include more or fewer parts. For example, the insulated grip 73 may include a single piece of insulating material that slides over the second side of the welding electrode 36, thereby enabling the insulated grip 34 to provide insulation and/or a handle for a welding operator to use during a welding operation.

Figure 5:
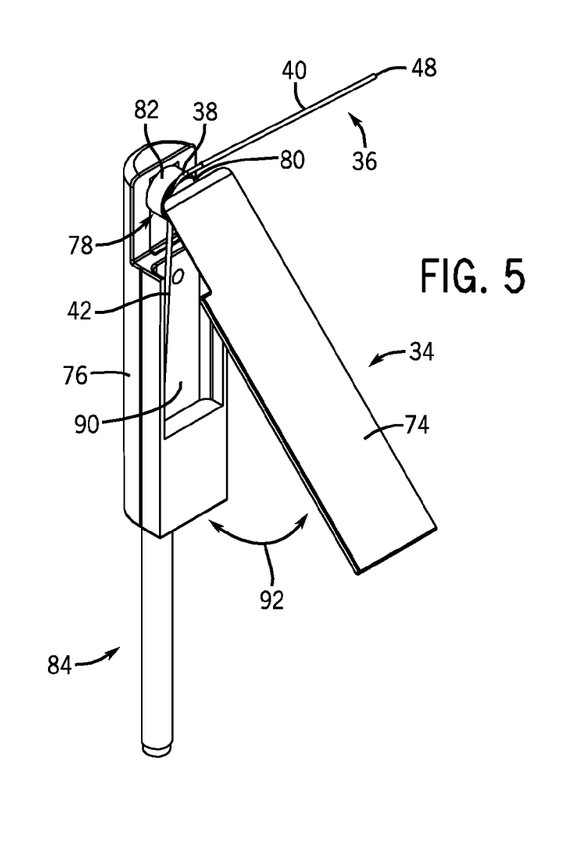
FIG. 5 is a perspective view of the welding torch assembly of FIG. 4 illustrating an embodiment of an electrode holder in an open position.

FIG. 5 illustrates the electrode holder 34 with the first side assembly 74 rotated to expose a recess 90 disposed in the second side assembly 76. As illustrated, the recess 90 is adapted to receive and retain the second side 42 of the welding electrode 36. As may be appreciated, if the electrode 36 is rotated to use the second side 42 for establishing a welding arc, the first side 40 may be held within the recess 90 of the second side assembly 76. In the illustrated embodiment, when the second side 42 of the welding electrode is retained in the recess 90 and the first side assembly 74 is in a closed position, the first side portion 40 of the welding electrode 36 is exposed for welding. That is, when the side assembly 74 is closed, the second side portion 42 is electrically insulated from the first side portion 40, through which welding current may flow when a weld power output from the welding power supply is applied.

As previously mentioned, the first side assembly 74 may move away from or toward the second side assembly 76, as depicted by arrow 92. When the first side assembly 74 is moved away from the second side assembly 76, the jaws 80 and 82 of the securing mechanism 78 may separate from each other and loosen their grip on the central portion 38 of the electrode 36. In the contrary, when the first side assembly 74 moves toward the second side assembly 76, the jaws 80 and 82 of the securing mechanism 78 move toward each other and tighten their grip on the central portion 38 of the electrode 36. As such, when the first side assembly 74 and the second side assembly 76 are pressed together, the electrode 36 is secured by the securing mechanism 78 and the first portion 40 of the welding electrode 36 is exposed.

Figures 6, 7:
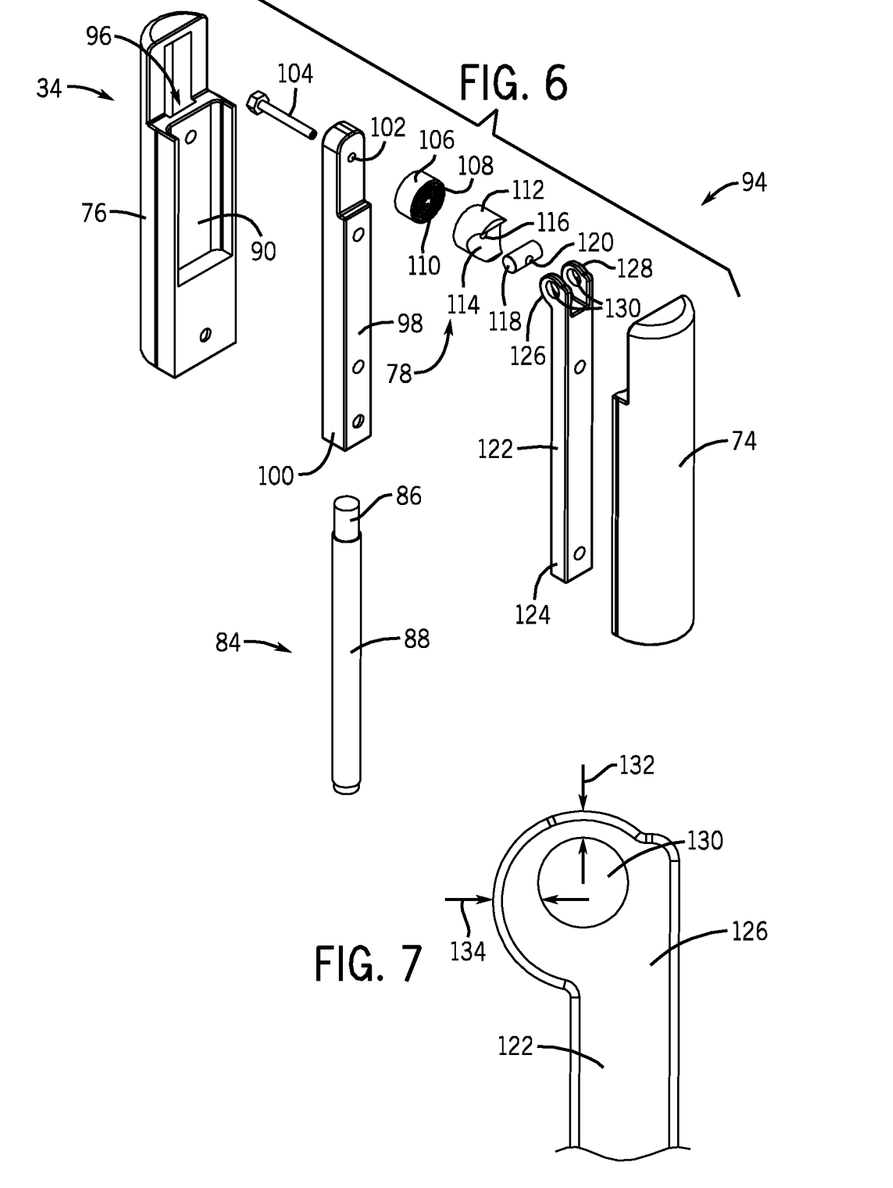
FIG. 6 is an exploded view of the welding torch assembly of FIG. 4.
FIG. 7 is a side view of an exemplary cam handle of a securing mechanism of an electrode holder in accordance with an embodiment of the present invention.

FIG. 6 is an exploded view of the embodiment of a welding torch assembly of FIG. 4. As previously mentioned, the second side assembly 76 includes the recess 90. The second side assembly 76 also includes an opening 96 adapted to receive an inserted conductor 98 when the torch 94 is assembled. The conductor 98 includes a lower end 100. The lower end 100 is coupled to the welding cable 84 so that a welding current may flow through the conductor 86 of the welding cable 84 and the conductor 98. An opening 102 in the conductor 98 enables a bolt 104 to be inserted into the conductor 98 to form one end of the securing mechanism 78. When assembled, the bolt 104 holds the securing mechanism 78 together.

Further, a jaw 106 includes a clamping surface 108 with ridges that press against an electrode when securing the electrode within the securing mechanism when the electrode holder is assembled. An opening 110 in the jaw 106 enables the bolt 104 to pass through the jaw 106. A second jaw 112 forms the opposite side of the clamp. The jaw 112 has a clamping surface and an indention 114 (i.e., cam portion) where a cam presses or relieves pressure on the jaws 106 and 112. An opening 116 in the jaw 112 enables the bolt 104 to pass through the jaw 112.

During assembly, a pin 118 with an opening 120 is inserted into an opening in a cam handle 122. The pin 118 and the cam handle 122 are positioned within the indention 114, and the bolt 104 is screwed into the opening 120 to connect the securing mechanism 78 together. The cam handle 122 includes a lower portion 124 that is inserted into the first side assembly 74. When the cam handle 122 is inserted into the first side assembly 74 and the conductor 98 is inserted into the second side assembly 76, the first and second side assemblies 74 and 76 are pivotally coupled together via the securing mechanism 78. The cam handle 122 also includes an upper portion with cams 126 and 128. The cams 126 and 128 have openings 130 where the pin 118 is inserted before the pin 118 is secured with the bolt 104. The conductor 98 and the jaws 106 and 112 are made of a metal conductor to enable a welding current to flow through the conductor 98 and the jaws 106 and 112 and also through a central portion of an electrode clamped or secured within the jaws 106 and 112.

When the cams 126 and 128 are positioned within the indention 114, the jaws 106 and 112 may be pressed together or have pressure relieved depending on the position of the cam handle 122 illustrated in FIG. 7. In the embodiment shown in FIG. 7, the cam 126 is depicted with the opening 130. The opening 130 is positioned off-center in the cam 126. That is, the uppermost distance 132 is smaller than the side distance 134. Thus, when the cam side defined by distance 134 rests against the indention 114 of jaw 112 of FIG. 6, a greater clamping force is exerted between the jaws 106 and 112 than when the cam side defined by distance 132 rests against the indention 114 of jaw 112.

Figure 8:
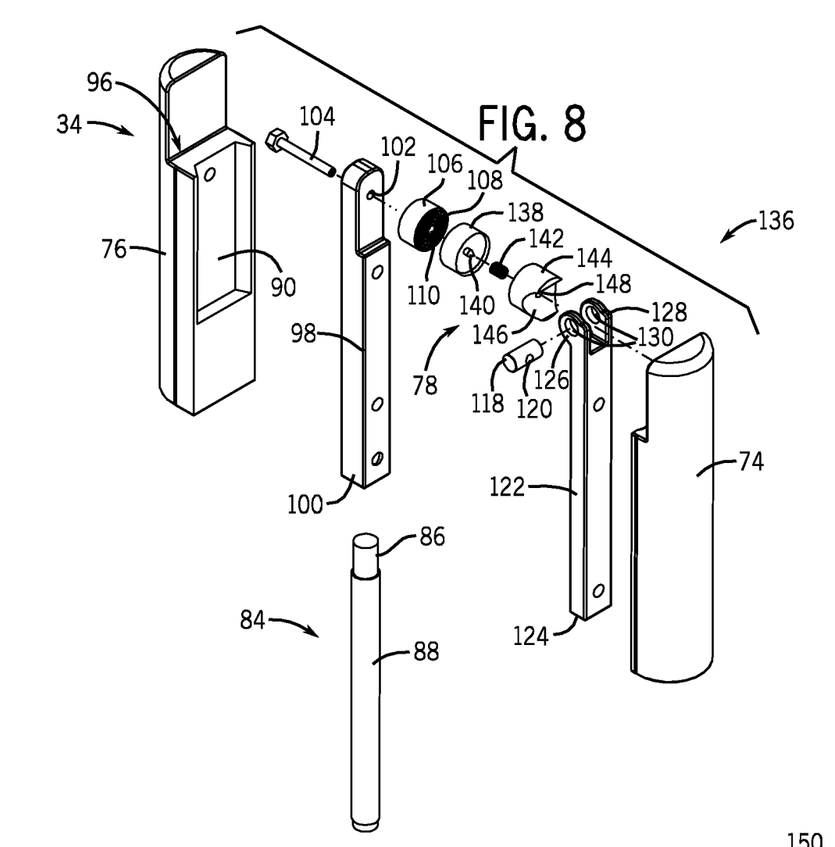
FIG. 8 is an exploded view of a welding torch assembly in accordance with an aspect of the present invention.

An exploded view of another embodiment of a welding torch assembly 136 is illustrated in FIG. 8. As before, the welding torch assembly 136 includes the first and second side assemblies 74 and 76, the conductor 98, and the cam handle 122. When assembled, the bolt 104 is inserted through the opening 102 in the conductor 98. The bolt 104 is also inserted through the opening in the jaw 106 and through another jaw 138 with an opening 140 and a clamping surface. When assembled, the jaws 106 and 138 secure the central portion of an electrode between their respective clamping surfaces. A spring 142 is inserted between the jaw 138 and a cam receiver 144 to exert a force against both the jaw 138 and the cam receiver 144. The cam receiver 144 includes an indention 146 where the cams 126 and 128 rest. The bolt 104 is inserted through the spring 142 and an opening 148 in the cam receiver 144. Furthermore, the pin 118 is inserted through the openings 130 and secured by the bolt 104 by screwing the bolt into the threaded opening 120.

As may be appreciated, with the addition of the spring 142 and jaw 138 as compared to previously described embodiments, the securing mechanism 78 of the embodiment illustrated in FIG. 8 may enable securing an increased variety of welding electrode diameters. Furthermore, the jaws 106 and 138 may rotate while maintaining some or all of the clamping force applied when the first and second side assemblies 74 and 76 are pressed together.

Figure 9:
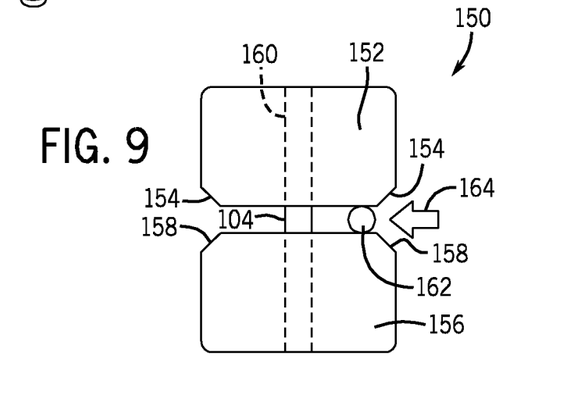
FIG. 9 illustrates an embodiment of a securing mechanism including jaws for clamping a welding electrode in accordance with an embodiment of the present invention.

The jaws 106 and 138 may include bevels, as illustrated in FIG. 9, to reduce the insertion force needed when an electrode is placed between the jaws. As shown, FIG. 9 illustrates a securing mechanism 150 that includes a jaw 152 with bevels 154 and a jaw 156 with bevels 158. A bolt 104 extends through a cavity 160 in the jaws 152 and 156. A welding electrode 162 is depicted within the jaws 152 and 156. A force 164 is applied to the electrode 162 to press the electrode 162 inside the jaws 152 and 156. As previously noted, the bevels 154 and 158 may reduce the insertion force 164 necessary to insert the electrode 162 as compared to designs without bevels. Likewise, the bevels 154 and 158 may aid insertion of the electrode 162 by guiding the electrode 162 into the jaws 152 and 156.

Figure 10:
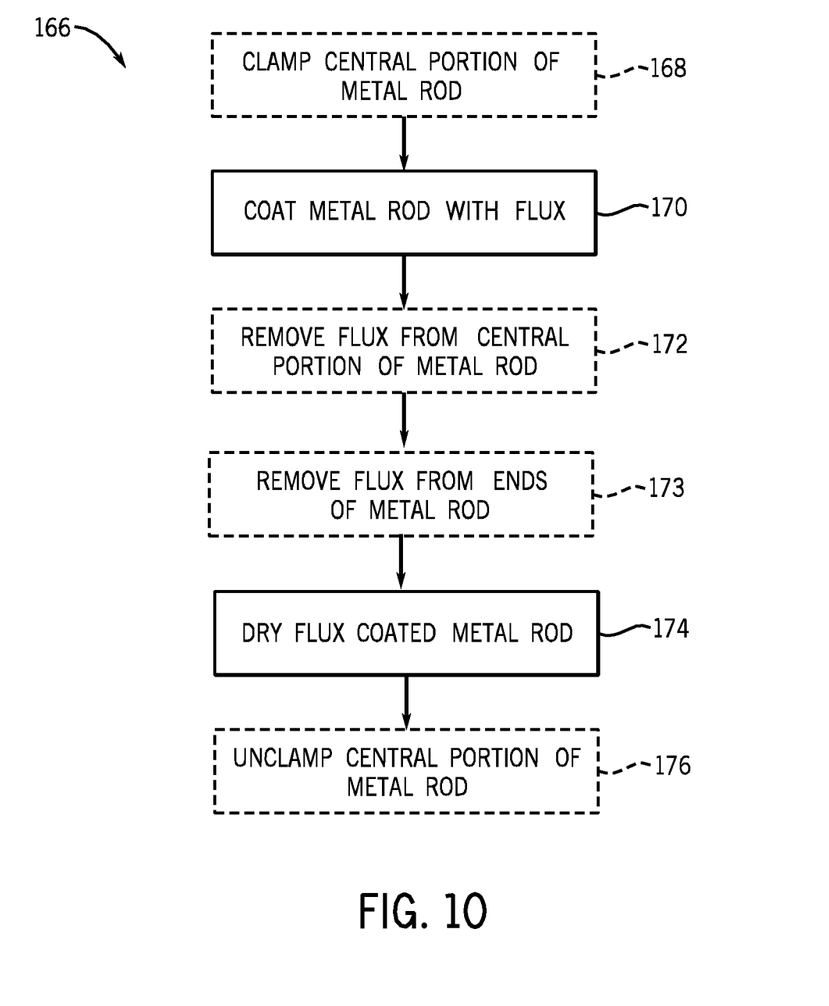
FIG. 10 illustrates a method of manufacturing an exemplary welding electrode in accordance with an embodiment of the present invention.

A flow chart of an embodiment of a method of manufacturing 166 a welding electrode is illustrated in FIG. 10. A central portion of a metal rod (i.e., a welding rod) may be clamped, at step 168, for the metal rod to be held while it is coated with a flux. The metal rod may be made from a variety of metals including steel, stainless steel, nickel, copper-nickel, iron-nickel, and other metals, for example. Next, at step 170, the metal rod is coated with flux. The flux may protect a weld area from oxidation and contamination by producing $CO_2$ during the welding process. The flux may be made from rutile, potassium silicate, sodium silicate, quartz, calcite, mica, iron alloys, or other materials, for example.

During step 170, the metal rod may be coated with flux by various methods including dipping the metal rod in a molten flux, through extrusion, and so forth. When dipping the metal rod in a molten flux, a clamped central portion may enable individual sides (i.e., the first and second sides) of the metal rod to be dipped while the clamped central portion may prevent flux from coating the clamped central portion. In another embodiment, the whole metal rod may be dipped into a flux. When coating the metal rod with flux through extrusion, the flux may be made into a paste and shaped into a cylindrical shape. The paste and metal rod may be passed through a die where the flux coats the metal rod. As such, the size of the die opening may alter the thickness of the flux coating.

At step 172, flux may be removed from the central portion of the metal rod to create an area where a welding torch may be secured to the metal rod. The flux may be removed using any available method, in order to expose the metal rod. For example, the flux may be removed by using a grinder or a rotating wire brush. Next, at step 173, flux on both ends of the metal rod may be beveled, thereby removing flux from the ends to create a contact surface for initiating a welding arc. Again, the flux may be removed by using a grinder or a rotating wire brush. After the flux is removed from the central portion and the ends of the metal rod, the coated metal rod with flux is dried, at step 174, to remove excess moisture from the flux. The coated metal rod may be dried in an oven, air dried, or the coated metal rod may be dried in any other manner.

Next, at step 176, if the metal rod was clamped at the central portion of the metal rod, the metal rod may be unclamped. By using a clamp over the central portion, not only can the metal rod be moved through the manufacturing process via the clamp, but also the clamp may inhibit flux from covering the central portion of the metal rod, thereby maintaining an exposed central portion of the metal rod. Although specific steps for manufacturing the electrode have been described, the steps may be altered or varied to achieve the same end result. Likewise, the steps may be performed in any suitable order.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding torch comprising:
 a securing mechanism and an insulated grip, the securing mechanism configured to secure an exposed central portion of a welding rod bounded by flux covered first and second sides and to make electrical contact with the central portion of the rod for arc welding with the first side, the insulated grip configured to cover and electrically insulate the second side of the welding rod, wherein the insulated grip comprises a first side assembly and a second side assembly pivotally coupled together, wherein the first and second side assemblies form a recess between the first and second side assemblies, wherein the recess covers and electrically insulates the second side of the welding rod when the first side assembly and the second side assembly are pressed together.

2. The torch of claim 1, wherein the securing mechanism comprises a clamp having a first jaw and a second jaw, the clamp configured to press the central portion of the welding rod between the jaws.

3. The torch of claim 2, wherein the first jaw and the second jaw comprise beveled edges.

4. The torch of claim 1, wherein the securing mechanism is configured to secure the welding rod when the first side assembly and the second side assembly are pressed together.

5. The torch of claim 1, wherein the insulated grip comprises a conductor electrically coupled to the securing mechanism and covered by an insulator, the conductor configured to conduct a welding current.

6. The torch of claim 1, wherein the securing mechanism comprises a first jaw and a second jaw configured to secure the central portion of the welding rod, the first jaw comprising a cam portion for creating a clamping force on the central portion of the welding rod.

* * * * *